United States Patent [19]

Green

[11] Patent Number: 4,711,931

[45] Date of Patent: Dec. 8, 1987

[54] FLAME RETARDED POLYCARBONATE POLYMERS

[75] Inventor: Joseph Green, East Brunswick, N.J.

[73] Assignee: FMC Corporation, Philadelphia, Pa.

[21] Appl. No.: 835,909

[22] Filed: Mar. 4, 1986

Related U.S. Application Data

[63] Continuation-in-part of Ser. No. 706,709, Feb. 28, 1985, abandoned.

[51] Int. Cl.⁴ .................. C08G 65/48; C08L 71/04
[52] U.S. Cl. ...................... 525/394; 525/397; 525/433; 525/439
[58] Field of Search .............. 525/394, 397, 433, 439; 524/133, 411, 412, 196, 287; 528/287

[56] References Cited

U.S. PATENT DOCUMENTS

| | | | |
|---|---|---|---|
| 2,916,473 | 12/1959 | Bullock et al. | 260/47 |
| 3,257,461 | 6/1966 | Rio | 528/287 |
| 3,334,154 | 8/1967 | Kim | 525/439 |
| 3,766,139 | 10/1973 | Bialous et al. | 260/47 X A |
| 3,847,866 | 11/1974 | Bredereck et al. | 260/47 X A |
| 4,035,343 | 4/1977 | Bollert et al. | 528/287 |
| 4,036,809 | 7/1977 | Keblys | 260/45.7 P |
| 4,054,552 | 10/1977 | Hoogeboom | 260/47 X A |
| 4,127,566 | 11/1978 | King et al. | 528/283 |
| 4,154,775 | 5/1979 | Axelrod | 260/874 |
| 4,195,156 | 3/1980 | Bruckdorfer | 528/171 |
| 4,255,324 | 3/1981 | Granzow et al. | 260/45.85 T |
| 4,278,588 | 7/1981 | Granzow | 260/45.7 P |
| 4,287,119 | 9/1981 | Brakemayer et al. | 260/45.95 L |
| 4,401,802 | 8/1983 | Schmidt et al. | 528/167 |
| 4,444,930 | 4/1984 | Guerin et al. | 524/125 |
| 4,444,978 | 4/1984 | Dick et al. | 528/167 |
| 4,472,570 | 9/1984 | Besecke et al. | 528/167 |
| 4,481,338 | 11/1984 | Serini et al. | 525/394 |

OTHER PUBLICATIONS

T. R. Nasser et al.—J. Applied Polymer Science, vol. 23, 85-99 (1979).
Hashimoto, S. et al.—J. Polymer Science, Polymer Chem Edition, vol. 12, 2357-2367 (1974).
Korshak V. V.—J. Polymer Science, 31, 319-26 (1958).

*Primary Examiner*—Morton Foelak
*Assistant Examiner*—Kriellion Morgan
*Attorney, Agent, or Firm*—Charles C. Fellows; Robert L. Andersen; Eugene G. Seems

[57] ABSTRACT

A polycarbonate polymer composition rendered flame retardant by having combined these with an effective amount of a phosphorus-containing polyester polymer which is the polycondensation product of a glycol, phthalate and a phosphine oxide of the formula:

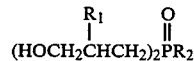

wherein $R_1$, may be the same or different radicals selected from the group consisting of hydrogen and methyl radicals and $R_2$ is a radical of 2 to 8 carbon atoms.

5 Claims, No Drawings

FLAME RETARDED POLYCARBONATE POLYMERS

This application is a continuation-in-part application of Ser. No. 706,709 filed Feb. 28, 1985 now abandoned.

The present application concerns polyesters containing bis(hydroxyalkyl) phosphine oxides used as effective flame retardants for polycarbonate polymers.

Polycarbonates are themselves recognized as self-extinguishing polymers. Nevertheless a higher level of flame resistance is required for certain applications. It is known to increase the flame-resistance of polycarbonates by using as an additive an organohalogen compound such as decabromodiphenyl ether or tetrachloro or tetrabromobisphenol-A as polycondensation components. Such flame-retarded (FR) polycarbonates have reduced thermal stability at processing conditions, are more brittle and degrade more under ultraviolet light than do non-flame retarded polycarbonate polymers. During combustion, this type of flame retarded polycarbonate is liable to release toxic, corrosive hydrochloric or hydrobromic acid.

Polycarbonates can be flame retarded by incorporating in them small amounts (less than 1.0%) of benzenesulfonic acids. U.S. Pat. No. 4,195,156 discloses flame retarding polycarbonates with benzenesulfonic acid salts containing hydroxyl groups (resorsinol derivatives which can copolymerize during polycarbonate manufacture). These hydroxyl containing benzenesulfonic acid salts accelerate polycarbonate polymer hydrolysis.

Organophosphorus compounds are known to impart flame retarding properties and do not release toxic or corrosive gases during combustion. Often organophosphorus compounds have too low a stability, are not sufficiently inert or have too high a vapor pressure and volatilize at polycarbonate processing temperatures or when such flame retarded polymers are exposed to high temperatures. Some organophosphorus compounds containing carbon-phosphorus bonds, such as phosphonates, have sufficient thermal stability to be employed as flame retarding additives in polycarbonate polymers (U.S. Pat. Nos. 4,036,809 and 4,444,930). Phosphinates are another group of additives that have been used to flame retard polycarbonate polymers (U.S. Pat. No. 4,036,809).

Other flame retardant additive systems which avoid halogen compounds were developed for styrene modified polyphenylene ether polymers (see U.S. Pat. Nos. 4,154,775 and 4,287,119). Phosphine oxides, e.g., triphenylphosphine oxide is disclosed in U.S. Pat. No. 4,278,588 as a non-halogenated flame retardant for polymer mixtures of polyphenylene ethers and modified styrene polymers. U.S. Pat. No. 4,255,324 describes mixtures of phosphine oxide with phosphonates, especially cyclic phosphonates to flame retard such mixed styrene polyphenylene ether polymers. U.S. Pat. No. 4,127,566 discloses but does not exemplify butyl bis(hydroxypropyl) phosphine oxide for use in preparing flame retardant, fiber forming polyester polymers.

Numerous phosphorus containing compounds and mixtures of compounds have been used to flame retard a variety of polymers and polymer mixtures. The known additives used for flame retarding polymers seriously degrade polycarbonate polymer physical properties.

The present invention provides novel flame retardant polycarbonate polymers made flame retardant by incorporation therein a flame retardant amount of a bis(hydroxyalkyl) phosphine oxide based linear polyester. These polyesters are produced by polymerizing a glycol phthalate with a reactive phosphine oxide. A polycarbonate polymer composition rendered flame retardant by having combined these with an effective amount of a phosphorus containing polyester polymer which is the polycondensation product of a glycol, phthalate and a phosphine oxide of the formula:

$$(HO\ CH_2CHCH_2)_2P\ R_2$$ with $R_1$ above P and $O$ above $R_2$ wherein $R_1$, may be the same or different radicals selected from the group consisting of hydrogen and methyl radicals and $R_2$ is a radical of 2 to 8 carbon atoms. The phosphorus atoms are in the polymer chain of the polyester polymer. Such low molecular weight polyesters will not volatilize during processing. Polyesters containing about 3% to 9% preferably at least 5% phosphorus when used as an additive at about 2 to 6% preferably at least 4% by weight in a commercial general purpose polycarbonate resin renders such resin highly flame resistant.

Polyesters useful in this invention are low molecular weight products, oligomers, having intrinsic viscosities up to about 0.6 and molecular weights of up to about 17,000, with molecular weights up to about 13,000 being preferred, and molecular weights of 700 to 13,000 being most preferred. Low molecular weight polyesters are preferred in the present invention both for the ease of incorporation into the polycarbonate and to improve processability. These polyesters are prepared by reacting one mole of diol with one mole of diacid or diester. The diol can be a mixture of butyl bis(3-hydroxypropyl) phosphine oxide with 1,4-butanediol or 1,2-ethanediol. For example, one mole of diester can be reacted with one half mole of 1,4-butanediol and one half mole of butyl bis(3-hydroxypropyl) phosphine oxide (BHPPO). The phosphorus content would be 5.4% (calculated). Table I shows calculated phosphorus percentages for various blends of ingredients. Polyesters containing BHPPO and one or the other of these diols were prepared. The intrinsic viscosities and molecular weights of these polyesters are listed in Table II.

TABLE I

| Dimethyl Terephthalate | 1,4 Butanediol or 1,2-ethanediol | BHPPO | % P |
|---|---|---|---|
| 1.0 moles | — moles | 2.0 moles | 10.8 |
| 1.0 | — | 1.0 | 8.8 |
| 1.0 | 0.5 | 0.5 | 5.4 |
| 1.0 | 0.7 | 0.3 | 3.6 |
| 1.0 | 0.9 | 0.1 | 1.3 |

TABLE II

| Diol | BHPPO | Intrinsic Viscosity | Molecular Weight |
|---|---|---|---|
| 1,4 Butanediol 70% | 30% | 0.5329 | 16,300 |
| 1,4 Butanediol 70% | 30% | 0.4339 | 12,700 |
| 1,2 Ethanediol 50% | 50% | 0.2259 | 5,800 |
| 1,4 Butanediol 55% | 45% | 0.1615 | 3,900 |
| 1,2 Ethanediol 50% | 50% | 0.0961 | 2,070 |
| 1,4 Butanediol 90% | 10% | 0.526 | 16,000 |

The following examples further illustrate the invention. Parts and percentages in the specification and examples are by weight unless otherwise indicated.

EXAMPLE

Preparation of Polybutylene Terephthalate (PBT) Containing Butyl bis(3-hydroxypropyl) Phosphine Oxide (BHPPO) in Polymer Backbone Dimethylterephthalate (327.6 g, 1.69 m) and butanediol (304.1 g, 3.37 m) were placed in a stainless steel reactor equipped with a stirrer, thermocouple and an evacuating tube connected to a vacuum pump and heated to about 160° C. Zinc acetate (0.2 g) was added to initiate transesterification. Heating was increased up to about 210° C. for about 2 hours as methanol was distilled. A color supressant (4. g) was added and the mixture was heated at 215° C./atmospheric pressure for 35 minutes at which time BHPPO (1.65. g, 0.74 m) followed by Fascat 5008, a polymerization catalyst, (0.2 g) were added. The reaction mixture was further gradually heated and simultaneously evacuated slowly so that a pressure of 1.0–5.0 mmHg at 260° C. was obtained over 30 minutes. A distillate was obtained. Then the temperature was further increased to 275°–290° C. at less than 1.0 mmHg over 40 minutes. Upon cooling to room temperature, 351 grams of a polymer was obtained: %P=4.96; intrinsic viscosity=0.1213; molecular weight=2700. Returned 318.6 g of the polymer back into the reactor with 0.1 g Fascat 5008 and continued the polycondensation for an additional 3 hours. After the heating 300 grams of product was collected: %P=5.13, 5.05; intrinsic viscosity=0.1388; molecular weight=3200.

EXMAPLE

FLAME RETARDING POLYCARBONATE

A general purpose polycarbonate resin (Lexan 141) was compounded with a 4% loading of the BHPPO-PBT flame retardant (molecular weight approximately 4000) prepared above, pelletized, and injection molded. Commercial flame retardant grades of polycarbonate resins, bromine-containing (Lexan 2014) and sulfonate salt-containing (Lexan 940), were molded for comparison. The following observations and flammability and physical properties were obtained.

| Properties | GP Lexan 141 | Lexan 2014 (FR) | Lexan 940 (FR) | Lexan 141 plus BHPPO-PBT |
|---|---|---|---|---|
| UL-94 | V-2 | V-0 | V-0 | V-0 |
| Oxygen Index | 25 | 29 | 35 | 30 |
| Melt Index(at 250° C.) (g/10 min.) | 1.8 | 1.0 | 1.4 | 6.4 |
| Izod Impact (Notched) (ft. lb./in.) | 2.9 | — | — | 1.1 |
| Flexural Strength (psi) | $13 \times 10^3$ | — | — | $14 \times 10^3$ |
| Flexural Modulus (psi) | $2.85 \times 10^5$ | — | — | $3.1 \times 10^5$ |
| HDT (°F.) | 248 | — | — | 266 |
| Compounding Temp.(°F.) | 518 | 542 | 542 | 482 |
| Torque (psi) | 6800 | 4600 | 4600 | 2300 |

The compounding and molding of the polycarbonate containing BHPPO-PBT was done at substantially lower temperature (60° F.) and torque (50%) compared to commercial FR polycarbonates. The clear phosphorus-containing FR polycarbonate exhibits significantly improved flow or processing properties.

I claim:

1. A polycarbonate polymer composition rendered flame retardant by having combined therewith an effective amount of a phosphorus containing polyester polymer containing 3% to 9% phosphorus and having a molecular weight of up to 17,000 which is the polycondensation product of a glycol, phthalate and a phosphine oxide of the formula:

wherein $R_1$, may be the same or different radicals selected from the group consisting of hydrogen and methyl radicals and $R_2$ is a radical of 2 to 8 carbon atoms.

2. The composition of claim 1 wherein the phosphine oxide is butyl bis(3-hydroxypropyl) phosphine oxide of the formula:

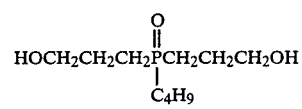

3. The composition of claim 1 wherein the polyester polymer has a molecular weight of up to 13,000.

4. The composition of claim 1 wherein the composition contains 2% to 6% by weight of the phosphorus containing polyester polymer.

5. The composition of claim 1 wherein the polyester polymer has a molecular weight of 700 to 13,000.

* * * * *